United States Patent [19]

Halse

[11] E Patent Number: Re. 31,752

[45] Reissued Date of Patent: Dec. 4, 1984

[54] CONTINUOUS STATIONERY ASSEMBLIES

[75] Inventor: Per W. Halse, Oslo, Norway

[73] Assignee: Moore Business Forms, Inc., Grand Island, N.Y.

[21] Appl. No.: 199,852

[22] Filed: Oct. 23, 1980

Related U.S. Patent Documents

Reissue of:

[64] Patent No.: 4,121,857
Issued: Oct. 24, 1978
Appl. No.: 817,859
Filed: Jul. 21, 1977

U.S. Applications:

[63] Continuation-in-part of Ser. No. 727,518, Sep. 28, 1976.

[30] Foreign Application Priority Data

Jul. 21, 1976 [GB] United Kingdom ..... 30407/76

[51] Int. Cl.[3] ..... B41L 1/20; B41L 1/26

[52] U.S. Cl. ..... 282/11.5 A; 282/11.5 R; 282/12 R; 282/19 R; 282/20 R

[58] Field of Search ..... 282/11.5 R, 11.5 A, 282/12 R, 12 A, 19 R, 19 A, 19 B, 24 R, 24 A, 24 B, 24 C, 20 R

[56] References Cited

U.S. PATENT DOCUMENTS

| | | | |
|---|---|---|---|
| 2,328,081 | 8/1943 | Johnson . | |
| 2,400,356 | 5/1946 | Kerr et al. | 282/24 R |
| 2,907,585 | 10/1959 | Soruberger et al. | 282/11.5 A |
| 3,854,654 | 12/1974 | Van Malderghein | 282/11.5 A X |
| 3,877,728 | 4/1975 | Herz . | |
| 3,941,308 | 3/1976 | Digirolomo . | |
| 4,113,281 | 9/1978 | Halse | 282/11.5 A |

FOREIGN PATENT DOCUMENTS

| | | |
|---|---|---|
| 829450 | 7/1949 | Fed. Rep. of Germany . |
| 1042612 | 7/1954 | Fed. Rep. of Germany . |
| 1105889 | 12/1957 | Fed. Rep. of Germany . |
| 974026 | 8/1960 | Fed. Rep. of Germany . |
| 1172283 | 6/1964 | Fed. Rep. of Germany . |
| 1174807 | 7/1964 | Fed. Rep. of Germany . |
| 1256659 | 12/1967 | Fed. Rep. of Germany . |
| 1957983 | 5/1971 | Fed. Rep. of Germany . |
| 97462 | 2/1961 | Norway . |
| 988148 | 4/1965 | United Kingdom . |
| 1154048 | 6/1969 | United Kingdom . |
| 1221969 | 2/1971 | United Kingdom . |
| 1286864 | 8/1972 | United Kingdom . |
| 1329063 | 9/1973 | United Kingdom . |
| 1006662 | 10/1975 | United Kingdom . |
| 1417683 | 12/1975 | United Kingdom . |
| 1418379 | 12/1975 | United Kingdom . |

*Primary Examiner*—Paul A. Bell
*Attorney, Agent, or Firm*—Allegretti, Newitt, Witcoff & McAndrews, Ltd.

[57] ABSTRACT

A series-connected business form is adapted to be fed through the printing means of a business machine and includes a continuous pair of superimposed outer webs each having feed bands including rows of spaced superimposed feed holes extending along opposite marginal edges thereof for engagement with the feed means of the business machine so that the form may be thereby advanced into and past the printing means. At least one intermediate web is disposed between the outer webs with transfer material lying on opposite sides of such intermediate web, and the intermediate web is secured to [only] one of the outer webs. The webs are divided by transverse lines of weakening so that the form is separable into individual units, and the one web and its attached intermediate web are removable from the remainder of each unit inwardly of the feed bands, so that, upon the printing of a number of such units, the next to the last of such units so printed may be separated along the transverse lines of weakening whereafter the one web and its intermediate web secured thereto of the last of such units may be separated from the other of such webs to leave such other web of the last unit and its connected feed bands available as a drive web for initiating the feed of the remaining units to be printed.

10 Claims, 4 Drawing Figures

CONTINUOUS STATIONERY ASSEMBLIES

Matter enclosed in heavy brackets [ ] appears in the original patent but forms no part of this reissue specification; matter printed in italics indicates the additions made by reissue.

This application is a continuation-in-part of U.S. application Ser. No. 727,518, filed Sept. 28, [1978] *1976*.

Many kinds of Continuous Stationery Assemblies have been proposed for feeding to the print units of what are referred to as mini-computers. These have included plain paper webs—perhaps bearing blocks of transverse lines spaced apart by distances of 1/6". These webs are made up into packs, the individual webs being interleaved with one time carbon webs. More sophisticated continuous stationery assemblies have also been used and these include for example the continuous manifold form assemblies described in British patent specification No. 919,496 and the Business Forms Stationery as described in British patent specification No. 1,376,447. All these assemblies include marginal feed apertures. Many of the continuous stationery assemblies are used with office computers and terminal printers and are used for relatively short runs. When such assemblies are positioned in the print unit of the computer the marginal feed apertures at opposite sides of the continuous stationery assembly are engaged on the feed pins of a pair of feed pin tractors at the outfeed side of the print unit. When it is required to feed the stationery assembly the tractors are driven and the stationery is fed. The tractors have of necessity to be positioned several inches above the printing position so that each time a fresh continuous stationery assembly is loaded into the front unit, one set (one form length) at the loading end of the assembly is lost.

Although this constitutes a loss each time a new pack of forms is loaded into the print unit greater losses are incurred when it is necessary to print a few form lengths at a time and especially if a single form length only is to be printed because at each printing operation a partly used pack is inserted and this entails losing one form length at each reloading.

A continuous form assembly is disclosed in the aforementioned U.S. Ser. No. 727,518 as comprising a plurality of continuous stationery webs with the last web and at least one other web containing lines of marginal feed apertures, the webs being joined together adjacent their margins wherein the webs intermediate the first and last webs have a width less than the width of the first and last webs, the intermediate webs being joined together and the first web of the assembly having a line of longitudinal perforations substantially in line with the edges of the intermediate webs so that the intermediate webs can be detached from the last web.

It is an object of the present member to provide an improved continuous stationery assembly.

It is another object of the present invention to provide an improved continuous stationery assembly in which it is not necessary to lose a form length each time a web of continuous stationery assembly is fed into the print unit or the like.

According to the present invention a continuous stationery assembly comprises a front web, a back web and at least one intermediate web with the webs being joined at one marginal edge, a line of longitudinal tear off perforations being provided in at least the front web to separate the back web from the other webs.

A continuous stationery assembly in accordance with the present invention will now be described by way of examples with reference to the accompanying drawings wherein.

Figure 1:
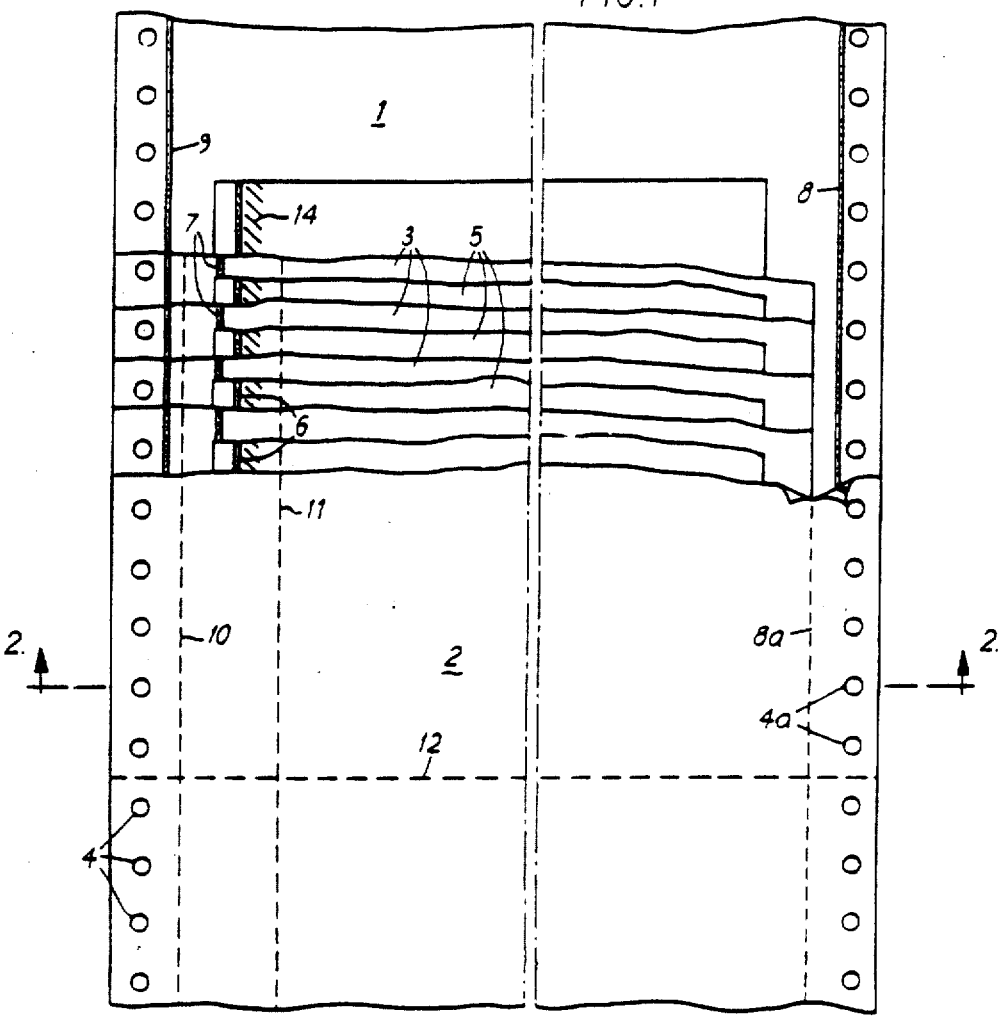
FIG. 1 is a diagrammatic plan view, partly cut away, of a continuous stationery assembly according to the invention.
Figure 2:
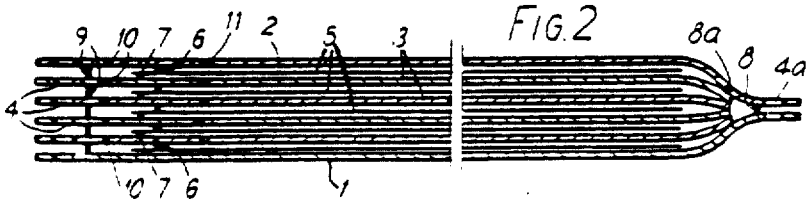
FIG. 2 is a cross-sectional view of the assembly taken substantially along line 2—2 of FIG. 1, with the distances between the parts of the assembly exaggerated for the sake of clarity.

Referring to FIGS. 1 and 2 of the drawings there is shown a continuous stationery assembly comprising a back web 1 and a front web 2 having a width of the same as that of the back web 1 and in registry therewith.

A plurality of intermediate record webs 3 are located between back web 1 and front web 2. The lefthand edge of these intermediate webs 3 (as viewed in FIG. 1) is in registry with the lefthand edges of front web 2 and of back web 1. Each of the intermediate webs 3 extends across and between webs 1 and 2 to a position short of the righthand edge of back web 1 and of front web 2. The lefthand side of each of the record webs 1, 2 and 3 has a line of longitudinal marginal feed apertures 4, the apertures in each web being in registry with corresponding feed apertures 4 in the other webs. A line of longitudinal feed apertures 4*a* is provided in the righthand side of back web 1 and of front web 2 in registry with each other. The righthand sides of the intermediate webs do not extend as far as the line of apertures 4*a*. Transfer webs 5 (for example of carbon paper) are interleaved with record webs 1, 2 and 3 to provide means for providing on record webs 1 and 3 a copy of the data, etc. written on front web 2. Transfer webs 5 are secured to webs 1 and 3 next above them by a respective longitudinal line of adhesive 6, and these transfer webs 5 are secured to intermediate webs 3 next beneath them by a respective longitudinal line of adhesive 7. The lowermost of the transfer webs [4] *5* is not, however, secured to back web 1 by such a line of adhesive.

A longitudinal line of adhesive 8 is provided a short distance within the righthand side line (FIGS. 1 and 2) of marginal feed apertures [3] *4a* to secure the righthand side of front web 2 and the righthand side of back web 1 together, and a longitudinal line 8a of tear off perforations is provided at one side of front web 2 just within the line of adhesive 8. This line of tear off perforations 8a is aligned with the righthand edge of intermediate record webs 3. Further lines of adhesive 9 are provided, one each such line being provided between front web 2 and the uppermost of intermediate webs 3, between each pair of adjacent intermediate webs 3, and between the lowermost of intermediate webs and back web 1. These lines of adhesive are each located at the lefthand side (FIGS. 1 and 2) of each web just within line 4 of feed apertures. A longitudinal line of tear off feed perforations 10 is provided just within lines of adhesive 9 in front web 2 and in each of intermediate webs 3 but not in back web 1. These lines of perforations when torn off separate the back web with the stub on the lefthand side from the record webs 3 and transfer webs 5.

A further set of lines 11 of longitudinal tear off perforations are provided in each of front web 2 and intermediate webs 3, but not in back web 1, just within the set of lines of adhesive 7 joining the transfer webs to the adjacent record webs. These lines 11 of perforations serve as snap out perforations to separate the part of the carbon webs from part of the record webs after the webs have been processed.

Each of back web 1, front web 2 and intermediate webs 3 are divided into form lengths by lines of transverse tear off perforations 12.

Preferably lines of inclined slits *14* are formed in transfer webs 5 between respective lines of adhesive 6 and 7. These inclined slits are more fully described in British Patent Specification No. 919,496.

A continuous stationery assembly as described is loaded into a mini-computer and data is printed on a form length assembly as is required. The form length is then fed by tractors of the mini-computer to the outfeed side of these tractors whereupon the typed form length of front web 2 of the assembly together with a corresponding form length of intermediate webs 3 is detached from the back web 1 by breaking the line of tear-off perforations 8a and 10. Thereby a form length set is detached. This form length set is in the form of a snap out set. The stub portion and the transfer webs can be separated from the record webs by tearing across the lines of snap-out perforations 11. The back web together with the marginal parts of the front web remain and serve as a drive sheet for feeding the remaining part of the web through the mini-computer. The stationery assembly can be removed from the mini-computer and when the assembly is reloaded the leading part of the assembly constitutes a means for being located on the feed pins of the tractors whereby the whole assembly can be fed through the mini-computer without losing the leading form length when reloading. It will be apparent that the back web of the assembly constitutes a file copy web.

Figure 3:
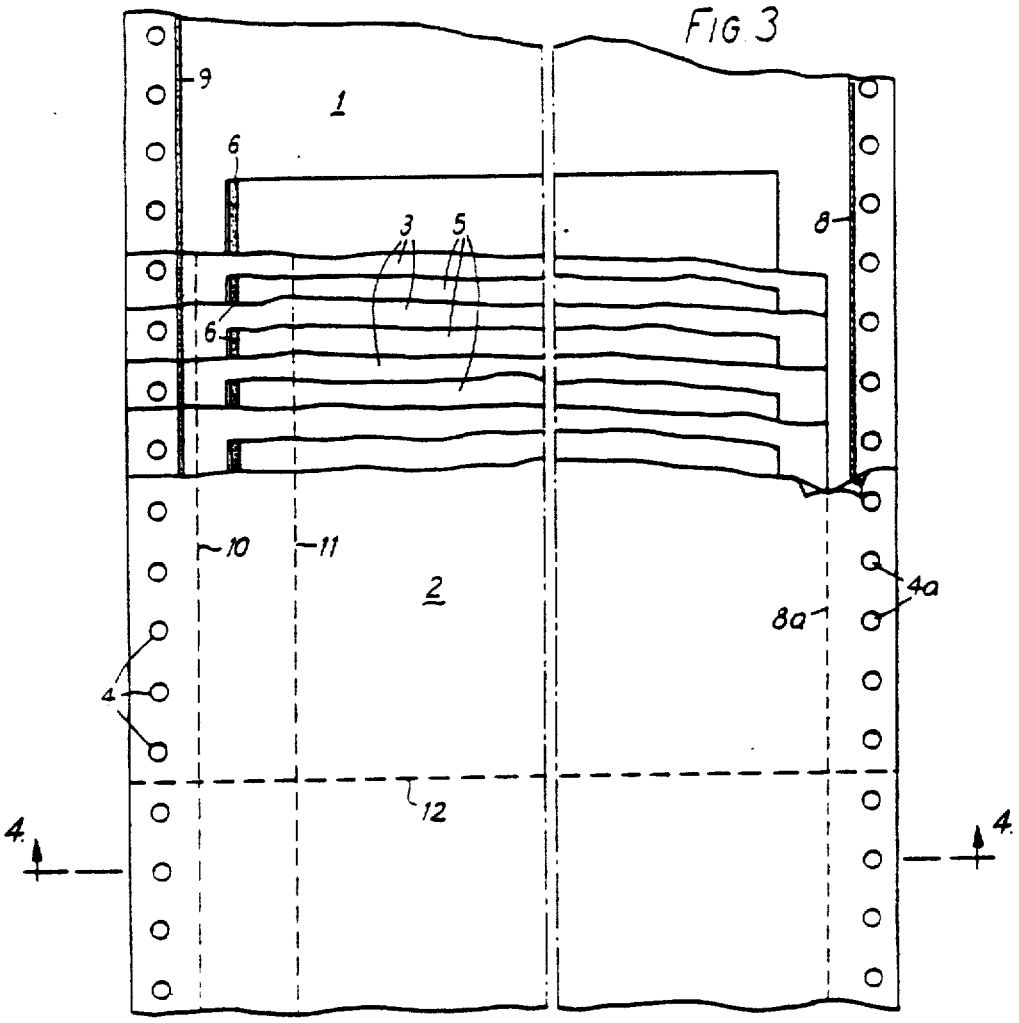
FIG. 3 is a diagrammatic plan view, partly cut away, of a continuous stationery assembly according to another embodiment of the invention.
Figure 4:
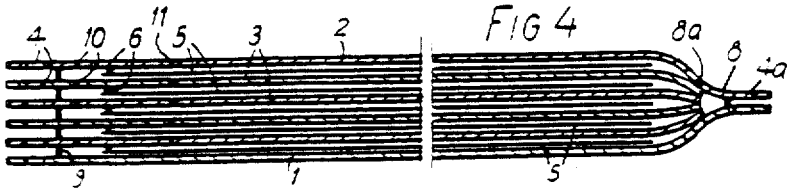
FIG. 4 is a sectional view of the assembly taken substantially along line 4—4 of FIG. 3.

A modified continuous stationery assembly is shown in FIGS. 3 and 4. This is similar to the assembly shown in FIGS. 1 and 2 and includes a back web 1, front web 2 with intermediate webs 3 with transfer webs 5. The assembly includes feed apertures 4, 4a and lines of adhesive joining the intermediate webs to the front and back webs. The transfer webs are secured to the front web and the intermediate web above them (but not to the back web) by respective lines 6 of adhesive between the under face of the front web or intermediate webs and the front face of the transfer webs. In this assembly there are no lines of inclined slits nor lines of adhesive securing the rear face of the transfer webs to the front face of the intermediate webs.

I claim:

1. A series-connected business form adapted to be fed through the printing means of a business machine, comprising, a continuous pair of superimposed outer webs having aligned opposed marginal edges, said webs having longitudinal feed strips extending along each of said marginal edges, said feed strips including spaced feed holes for engaging the feed means of the business machine so that the business form may be thereby advanced into and past the printing means, said webs being directly connected together along longitudinal first connecting means lying adjacent said feed holes of one of said strips extending along one of said marginal edges, one of said webs having a longitudinal first line of weakening spaced inwardly of said first connecting means, at least one intermediate web disposed between said outer webs, said intermediate web having a free marginal edge lying adjacent said first line of weakening and having an opposite free marginal edge in alignment with the other of said opposed marginal edges of said outer webs, said one outer web having a longitudinal second line of weakening adjacent said other marginal edge, said intermediate web being connected to both said outer webs along longitudinal second connecting means disposed between said other marginal edge of said outer webs and said second line of weakening, said intermediate web having a longitudinal third line of weakening in alignment with said second line of weakening, and said webs having spaced transverse lines of weakening in superimposed relationship for separating the form therealong into individual units, whereby upon the printing of a number of said units, the next to the last of said units so printed may be separated along said transverse lines of weakening whereafter said one web and said intermediate web connected thereto of the last of said units so printed may be removed by separation along said first and second lines of weakening from said other outer web thereby leaving said other web of said last unit together with said feed strips thereon available as a drive web for initiating the feed of the remaining units to be advanced into and past the printing means.

2. The business form according to claim 1, wherein webs of transfer material are disposed between said one outer and said intermediate webs and between said intermediate and said other outer webs and have spaced transverse lines of weakening in superimposed relationship with said transverse lines in said one, said intermediate and said other webs, said transfer webs being respectively secured to said one outer and only to said intermediate webs along longitudinal third connecting means, said one outer and said intermediate webs having aligned longitudinal [third] *fourth* lines of weakening therein located inwardly of said third connecting means, whereby said one outer and said intermediate webs may be separated along said [third] *fourth* lines of weakening after the removal thereof from said other web.

3. The business form according to claim 2, wherein said transfer web between said one outer and said intermediate webs is also secured to said intermediate web.

4. The business form according to claim 1, wherein a plurality of intermediate webs are disposed between said outer webs and have opposed free marginal edges respectively lying adjacent said first line *of weakening* and in alignment with said other edges, adjacent intermediate webs being interconnected together.

*5. A continuous stationery assembly, comprising, a continuous pair of superimposed outer webs each having aligned opposed left and right marginal edges, said webs having longitudinal feed strips extending along each of said right marginal edges, said webs being directly connected together along longitudinal first connecting means lying adjacent said right marginal edges, one of said webs having a longitudinal first line of weakening spaced inwardly of said first connecting means, at least one intermediate web disposed between said outer webs, said intermediate web having a free marginal edge lying inward of said first line of weakening, said one outer web having a longitudinal second line of weakening adjacent said left marginal edge, said intermediate web being connected to both said outer webs along longitudinal second connecting means disposed*

*between each said left marginal edge of said outer webs and said second line of weakening, said intermediate web having a longitudinal third line of weakening in alignment with said second line of weakening.*

*6. A continuous stationery assembly as claimed in claim 5 in which said one outer web includes a longitudinal fourth line of weakening between the first line of weakening and the second line of weakening, and the intermediate web includes a longitudinal fifth line of weakening in superimposed relationship with the fourth line of weakening, the intermediate web being connected to the one outer web between the superimposed, longitudinal second and third lines of weakening and the superimposed, longitudinal fourth and fifth lines of weakening.*

*7. A continuous stationery assembly as claimed in claim 5 in which the intermediate web is one intermediate web and further comprising another intermediate web having a free marginal edge spaced inwardly of the first line of weakening, and a longitudinal sixth line of weakening in superimposed relationship with the longitudinal second and third lines of weakening, the another intermediate web being directly connected to the other outer web between the left marginal edges and the superimposed, longitudinal second and third lines of weakening and being connected to the one intermediate web between the left marginal edges and the superimposed, longitudinal second and third lines of weakening, the one intermediate web thereby being connected to the other outer web through connection to the other intermediate web.*

*8. A continuous stationery assembly, comprising, a continuous pair of superimposed outer webs each having aligned opposed right and left marginal edges, said webs having longitudinal feed strips extending along each of said left marginal edges, said webs being directly connected together along longitudinal first connecting means lying adjacent said left marginal edges, one of said webs having a longitudinal first line of weakening spaced inwardly of said first connecting means, at least one intermediate web disposed between said outer webs, said intermediate web having a free marginal edge lying inward of said first line of weakening, said one outer web having a longitudinal second line of weakening adjacent said right marginal edge, said intermediate web being connected to both said outer webs along longitudinal second connecting means disposed between each said right marginal edge of said outer webs and said second line of weakening, said intermediate web having a longitudinal third line of weakening in alignment with said second line of weakening.*

*9. A continuous stationery assembly as claimed in claim 5 in which said one outer web includes a longitudinal fourth line of weakening between the first line of weakening and the second line of weakening, and the intermediate web includes a longitudinal fifth line of weakening in superimposed relationship with the fourth line of weakening, the intermediate web being connected to the one outer web between the superimposed, longitudinal second and third lines of weakening and the superimposed, longitudinal fourth and fifth lines of weakening.*

*10. A continuous stationery assembly as claimed in claim 5 in which the intermediate web is one intermediate web and further comprising another intermediate web having a free marginal edge spaced inwardly of the first line of weakening, and a longitudinal sixth line of weakening in superimposed relationship with the longitudinal second and third lines of weakening, the another intermediate web being directly connected to the other outer web between the right marginal edges and the superimposed, longitudinal second and third lines of weakening and being connected to the one intermediate web between the right marginal edges and the superimposed, longitudinal second and third lines of weakening, the one intermediate web thereby being connected to the other outer web through connection to the other intermediate web.*

* * * * *

UNITED STATES PATENT AND TRADEMARK OFFICE

CERTIFICATE OF CORRECTION

PATENT NO. : Re. 31,752

DATED : December 4, 1982

INVENTOR(S) : Halse

It is certified that error appears in the above-identified patent and that said Letters Patent is hereby corrected as shown below:

Column 6, lines 13 and 23, the claim dependency numeral "5", each occurrence, should read --8--.

Signed and Sealed this

Seventeenth Day of May, 1988

*Attest:*

*Attesting Officer*

DONALD J. QUIGG

*Commissioner of Patents and Trademarks*